US012801340B2

(12) United States Patent
Ruan et al.

(10) Patent No.: US 12,801,340 B2
(45) Date of Patent: Nov. 17, 2026

(54) AUDIO CONTROL METHOD AND ELECTRONIC DEVICE

(71) Applicant: Acer Incorporated, New Taipei City (TW)

(72) Inventors: Yu-Shan Ruan, New Taipei City (TW); Liang-Chi Chen, New Taipei City (TW); Chao-Kuang Yang, New Taipei City (TW); Mei-Chun Wu, New Taipei City (TW)

(73) Assignee: Acer Incorporated, New Taipei City (TW)

( * ) Notice: Subject to any disclaimer, the term of this patent is extended or adjusted under 35 U.S.C. 154(b) by 165 days.

(21) Appl. No.: 18/928,186

(22) Filed: Oct. 28, 2024

(65) Prior Publication Data

US 2026/0064356 A1 Mar. 5, 2026

(30) Foreign Application Priority Data

Aug. 28, 2024 (TW) ................................. 113132307

(51) Int. Cl.
*G06F 3/16* (2006.01)
*G06T 7/73* (2017.01)
*G06V 40/16* (2022.01)

(52) U.S. Cl.
CPC ................ *G06F 3/165* (2013.01); *G06T 7/73* (2017.01); *G06V 40/176* (2022.01)

(58) Field of Classification Search
CPC ........ G01C 21/16; G02C 11/00; G02C 11/10; G06F 3/165; G06F 16/4387; G06F 3/012;
(Continued)

(56) References Cited

U.S. PATENT DOCUMENTS 9,271,103 B2 * 2/2016 Wells ...................... H04S 7/304
9,575,971 B2 * 2/2017 Hampiholi .......... G06F 16/4387
(Continued)

FOREIGN PATENT DOCUMENTS

CN 102118556 7/2011
CN 108777827 11/2018
(Continued)

*Primary Examiner* — Gerald Gauthier
(74) *Attorney, Agent, or Firm* — JCIPRNET

(57) ABSTRACT

An audio control method and an electronic device are disclosed. The method includes: obtaining candidate image data through an image capture device based on a first image capture frequency, wherein the candidate image data presents a head image of a target user; determining a second image capture frequency based on ability information, wherein the ability information reflects an adjustment ability of an audio adjustment module for an output audio, and the second image capture frequency is lower than the first image capture frequency; obtaining target image data from the candidate image data based on the second image capture frequency; processing the target image data through an image analysis module to obtain situational information related to the target user; processing the situational information through the audio adjustment module to obtain an audio adjustment parameter; and adjusting the output audio of an audio output device based on the audio adjustment parameter.

10 Claims, 3 Drawing Sheets

(58) Field of Classification Search

CPC ...... G06F 3/013; G06N 20/00; G06N 3/0464; G06T 7/73; G06V 40/176; G06V 40/171; G08B 17/08; G10L 13/027; H04S 7/303; H04S 7/301; H04S 7/304; H04N 5/642; G01H 3/125

See application file for complete search history.

(56) References Cited

U.S. PATENT DOCUMENTS

| | | | | |
|---|---|---|---|---|
| 9,781,537 | B2 * | 10/2017 | Smith | H04S 7/301 |
| 9,980,076 | B1 * | 5/2018 | Pratt | H04S 7/303 |
| 10,089,063 | B2 * | 10/2018 | Thagadur Shivappa | G06F 3/011 |
| 10,555,106 | B1 * | 2/2020 | Mehra | G06F 3/165 |
| 10,602,264 | B2 * | 3/2020 | Wexler | H04R 1/345 |
| 10,956,122 | B1 * | 3/2021 | Agrawal | G06V 40/171 |
| 10,956,725 | B2 * | 3/2021 | Menefee | G06F 3/013 |
| 11,082,460 | B2 * | 8/2021 | Nesta | G06F 3/012 |
| 11,425,523 | B2 * | 8/2022 | Selfon | H04S 7/303 |
| 11,470,415 | B2 * | 10/2022 | Paiement | H04R 1/1041 |
| 11,977,813 | B2 * | 5/2024 | Kwatra | G06N 3/0464 |
| 2003/0156075 | A1 * | 8/2003 | Motoyama | H04N 5/642 345/1.3 |
| 2015/0006541 | A1 * | 1/2015 | Hampiholi | G06F 16/4387 707/741 |
| 2018/0350344 | A1 * | 12/2018 | Zaslow | G10L 13/027 |
| 2019/0034157 | A1 * | 1/2019 | Steinberg | G06F 3/165 |
| 2019/0052964 | A1 | 2/2019 | Ma et al. | |
| 2019/0191084 | A1 | 6/2019 | Tsai et al. | |
| 2020/0143649 | A1 * | 5/2020 | Coonley | G08B 17/08 |
| 2020/0169825 | A1 * | 5/2020 | Gong | H04S 7/303 |
| 2021/0127200 | A1 * | 4/2021 | Zhang | G02C 11/10 |
| 2021/0293953 | A1 * | 9/2021 | Stuart | G01H 3/125 |
| 2021/0311689 | A1 * | 10/2021 | Kwon | G06F 3/165 |
| 2023/0186738 | A1 * | 6/2023 | Yokoyama | G06F 3/165 340/407.1 |
| 2023/0260531 | A1 * | 8/2023 | Srivastava | G06N 20/00 704/233 |
| 2026/0064356 | A1 * | 3/2026 | Ruan | G06F 3/165 |

FOREIGN PATENT DOCUMENTS

| | | |
|---|---|---|
| CN | 116386568 | 7/2023 |
| TW | 201034460 | 9/2010 |
| TW | 201113864 | 4/2011 |
| TW | 202224417 | 6/2022 |
| TW | 202245684 | 12/2022 |
| TW | 202249503 | 12/2022 |
| TW | I797230 | 4/2023 |

* cited by examiner

AUDIO CONTROL METHOD AND ELECTRONIC DEVICE

CROSS-REFERENCE TO RELATED APPLICATION

This application claims the priority benefit of Taiwan application serial no. 113132307, filed on Aug. 28, 2024. The entirety of the above-mentioned patent application is hereby incorporated by reference herein and made a part of this specification.

BACKGROUND

Technical Field

The disclosure relates to an audio control method and an electronic device.

Description of Related Art

Traditionally, when a user uses an electronic device (such as a personal computer or a smartphone) for online meetings or entertainment activities like watching movies, the electronic device does not actively adjust an output audio thereof (such as sound field and/or volume of left and right channels). Although certain types of electronic devices (such as the smartphone) may use pupil detection technology to detect whether the user is watching the screen and can actively pause video playback, this technology does not involve simply adjusting the output audio of the electronic device. Therefore, in some situations, once the current relative position between the user and the electronic device changes or the user encounters certain special situations (such as someone approaching or the user conversing with others), the user can only manually adjust the output audio of the electronic device to meet current needs. In the long run, the willingness of the user may be significantly affected to conduct online meetings or watch movies and other entertainment activities through the electronic device. Moreover, simply applying image analysis technology to real-time image analysis and output audio control may also lead to a significant increase in energy consumption of the electronic device.

SUMMARY

The disclosure provides an audio control method and an electronic device, which can improve the aforementioned problems.

An embodiment of the disclosure provides an audio control method, which includes: obtaining candidate image data through an image capture device based on a first image capture frequency, where the candidate image data presents a head image of a target user; determining a second image capture frequency based on ability information, where the ability information reflects an adjustment ability of an audio adjustment module for an output audio of an audio output device, and the second image capture frequency is lower than the first image capture frequency; obtaining target image data from the candidate image data based on the second image capture frequency; processing the target image data through an image analysis module to obtain situational information related to the target user; processing the situational information through the audio adjustment module to obtain an audio adjustment parameter; and adjusting the output audio of the audio output device based on the audio adjustment parameter.

An embodiment of the disclosure also provides an electronic device, which includes an image capture device, an audio output device, and a processor. The processor is coupled to the image capture device and the audio output device. The processor is configured to: obtain candidate image data through the image capture device based on a first image capture frequency, where the candidate image data presents an head image of a target user; determine a second image capture frequency based on ability information, where the ability information reflects an adjustment ability of an audio adjustment module to an output audio of the audio output device, and the second image capture frequency is lower than the first image capture frequency; obtain target image data from the candidate image data based on the second image capture frequency; process the target image data through an image analysis module to obtain situational information related to the target user; process the situational information through the audio adjustment module to obtain an audio adjustment parameter; and adjust the output audio of the audio output device based on the audio adjustment parameter.

Based on the above, the candidate image data may be obtained through the image capture device based on the first image capture frequency, and the candidate image data may present the head image of the target user. The second image capture frequency may be determined based on the ability information. Specifically, the ability information may reflect the adjustment ability of the audio adjustment module for the output audio of the audio output device, and the second image capture frequency is lower than the first image capture frequency. The target image data may be obtained from the candidate image data based on the second image capture frequency. The situational information related to the target user may be obtained by processing the target image data through the image analysis module. The audio adjustment parameter may be obtained by processing the situational information through the audio adjustment module. Then, the output audio of the audio output device may be adjusted based on the audio adjustment parameter. In this way, a good balance may be achieved between suppressing the energy consumption generated by the electronic device performing image analysis as much as possible and the automated adjustment executed on the output audio based on image analysis.

DESCRIPTION OF THE EMBODIMENTS

Figure 1:
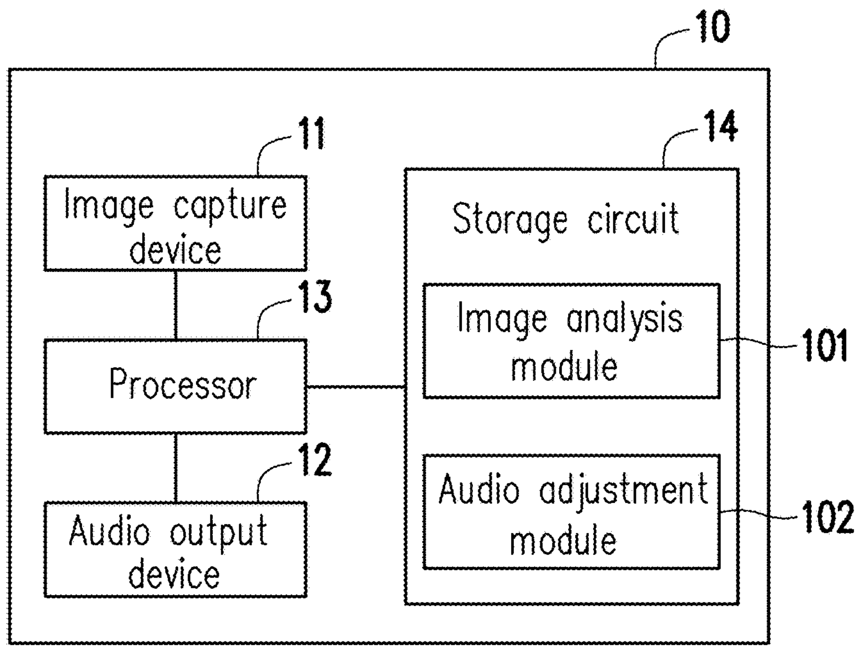
FIG. 1 is a schematic diagram illustrating an electronic device according to an embodiment of the disclosure.

FIG. 1 is a schematic diagram illustrating an electronic device according to an embodiment of the disclosure. Referring to FIG. 1, an electronic device 10 includes various electronic devices that support functions like image capturing, image processing, and audio outputting, such as smartphones, tablet computers, laptops, desktop computers, servers, game consoles, or in-vehicle computers, and the type of the electronic device 10 is not limited thereto.

The electronic device 10 includes an image capture device 11, an audio output device 12, a processor 13, and a storage circuit 14. The image capture device 11 is configured to capture an external image to obtain image data (also referred to as candidate image data). For example, the image capture device 11 may include image capture components such as a lens and a photosensitive element to implement image capturing.

In an embodiment, the image capture device 11 is disposed in the electronic device 10. In another embodiment, the image capture device 11 is an external image capture device and coupled to the electronic device 10. Furthermore, the disclosure does not limit the quantity and type of the image capture device 11.

The audio output device 12 is configured to generate an output audio. For example, the audio output device 12 may include a speaker and/or a pair of headphones. Furthermore, the disclosure does not limit the quantity and type of the audio output device 12.

The processor 13 is coupled to the image capture device 11, the audio output device 12, and the storage circuit 14. The processor 13 is responsible for the overall or partial operation of the electronic device 10. For example, the processor 13 may include a central processing unit (CPU), a graphic processing unit (GPU), or a programmable microprocessor for a common purpose or a specific purpose, a digital signal processor (DSP), a programmable controller, an application specific integrated circuit (ASIC), a programmable logic device (PLD), or other similar devices, or a combination thereof.

In an embodiment, the processor 13 may further include specialized processors to assist in executing neural network computations and/or image processing, such as a vision processing unit (VPU), a neural network processing unit (NPU), and/or a tensor processing unit (TPU). Furthermore, the disclosure does not limit the quantity and type of the processor 13.

The storage circuit 14 is configured to store data. For example, the storage circuit 14 may include a volatile storage circuit and a non-volatile storage circuit. The volatile storage circuit is configured to store data volatilely. For example, the volatile storage circuit may include a random access memory (RAM) or similar volatile storage media. The non-volatile storage circuit is configured to store data non-volatilely. For example, the non-volatile storage circuit may include a read only memory (ROM), a solid state disk (SSD), a hard disk drive (HDD), or similar non-volatile storage media. Furthermore, the disclosure does not limit the quantity and type of the storage circuit 14.

In an embodiment, the electronic device 10 may further include various input/output devices or peripheral devices such as a power management circuit, a network interface card, a mouse, a keyboard, a display, and/or a microphone. The types of input/output interfaces and peripheral devices are not limited to thereto.

In an embodiment, the storage circuit 14 may be configured to store an image analysis module 101. The image analysis module 101 may be configured to analyze the image data and automatically generate corresponding output information (also referred to as situational information). For example, the image analysis module 101 includes an artificial intelligence (AI) model, a machine learning (ML) model, and/or a deep learning (DL) model. For instance, the image analysis module 101 may be implemented by a neural network architecture such as a deep neural network (DNN), a convolutional neural network (CNN), a recurrent neural network (RNN), or other types of algorithmic architectures. In an embodiment, the image analysis module 101 may also be stored in an external device (for example, a cloud server). Furthermore, the image analysis module 101 may be trained to improve the accuracy of detection and/or analysis.

In an embodiment, the storage circuit 14 may further be configured to store an audio adjustment module 102. The audio adjustment module 102 may be configured to generate an adjustment parameter (also referred to as an audio adjustment parameter) automatically based on the output (that is, the situational information) of the image analysis module 101. The audio adjustment parameter may be configured to adjust the output audio of the audio output device 12.

In an embodiment, the audio adjustment module 102 may generate the audio adjustment parameter based on the situational information through algorithms or table lookup. In an embodiment, the audio adjustment module 102 may also include the artificial intelligence (AI) model, the machine learning (ML) model, and/or the deep learning (DL) model. For example, the audio adjustment module 102 may also be implemented through the neural network architecture such as the deep neural network (DNN), the convolutional neural network (CNN), the recurrent neural network (RNN), or other types of algorithmic architectures. In an embodiment, the audio adjustment module 102 may be combined with a controller, a control software, or a control firmware of the audio output device 12.

In an embodiment, the image capture device 11 may capture the external image based on a certain image capture frequency (also referred to as a first image capture frequency) to obtain the candidate image data. For example, the candidate image data may include at least one image (also referred to as a candidate image). The candidate image may reflect the image content of the external image.

In an embodiment, the processor 13 may obtain the candidate image data through the image capture device 11 based on the first image capture frequency. Specifically, the candidate image data may present a head image of at least one user (also referred to as a target user).

In an embodiment, the first image capture frequency may be configured to control a total number (also referred to as a first image number) of images (that is, the candidate image) obtained through the image capture device 11 within a predetermined time range. For example, the first image capture frequency may be positively correlated with the first image number. That is, if the first image capture frequency is higher, the first image number may be greater. For example, the predetermined time range may be 5 seconds, 10 seconds, or other time ranges, which is not limited by the disclosure.

In an embodiment, the first image capture frequency is related to the performance (also referred to as image capture performance) of the image capture device 11. For example, the first image capture frequency may be positively correlated with the performance of the image capture device 11. That is, if the performance of the image capture device 11 is higher, the first image capture frequency may be higher. In an embodiment, the processor 13 may decide the first image capture frequency based on the performance of the image capture device 11.

In an embodiment, the processor 13 may obtain information (also referred to as ability information) related to the adjustment ability of the audio adjustment module 102 for the output audio of the audio output device 12. The ability information may reflect the adjustment ability of the audio adjustment module 102 for the output audio of the audio output device 12. In an embodiment, if the audio adjustment module 102 indicates the audio output device 12 to adjust output audio thereof in a manner that exceeds the adjustment ability of the audio adjustment module 102 for the output audio of the audio output device 12, then limited by the software/hardware performance of the audio output device 12, the audio output device 12 may not satisfy all adjustment instructions from the audio adjustment module 102.

In an embodiment, the ability information may reflect at least one of the maximum adjustment time and the maximum adjustment magnitude for the output audio of the audio output device 12 by the audio adjustment module 102 within each unit time range (or the predetermined time range). For example, the ability information may reflect that the maximum adjustment time for the output audio of the audio output device 12 by the audio adjustment module 102 within each unit time range (or the predetermined time range) is "2 times" or the adjustment magnitude is "10%" of the total adjustment range, and the disclosure is not limited thereto.

In an embodiment, the processor 13 may decide another image capture frequency (also referred to as a second image capture frequency) based on the ability information. Specifically, the second image capture frequency may be lower than the first image capture frequency. For example, assuming that the first image capture frequency is represented by frequency f(1) and the second image capture frequency is represented by frequency f(2), then frequency f(2) may be less than frequency f(1).

In an embodiment, the adjustment ability of the audio adjustment module 102 for the output audio may be positively correlated with the second image capture frequency. That is, if the ability information reflects that at least one of the maximum adjustment time and the maximum adjustment magnitude for the output audio of the audio output device 12 by the audio adjustment module 102 within each unit time range is higher, then the second image capture frequency may be higher.

In an embodiment, the processor 13 may obtain at least one portion of the image data (also referred to as target image data) from the candidate image data based on the second image capture frequency. For example, assuming that the target image data includes at least one image (also referred to as a target image), the processor 13 may obtain the target image from the candidate image based on the second image capture frequency.

In an embodiment, the second image capture frequency may be configured to control a total number (also referred to as a second image number) of images (that is, the target image) obtained from the candidate image within the predetermined time range. For example, the second image capture frequency may be positively correlated with the second image number. That is, if the second image capture frequency is higher, then the second image number may be greater.

In an embodiment, setting the second image capture frequency to be less than the first image capture frequency may reduce the total number of the target image for subsequent image analysis or image processing by the image analysis module 101, without affecting the normal operation of the image capture device 11. In this way, the energy consumption generated by the electronic device 10 (for example, the image analysis module 101) performing image analysis may be reduced. Furthermore, the second image capture frequency is set based on the ability information. Therefore, by properly setting the second image capture frequency, a good balance may be achieved between suppressing the energy consumption generated by the electronic device 10 (for example, the image analysis module 101) performing image analysis as much as possible and the automated adjustment of the output audio based on image analysis.

Figure 2:
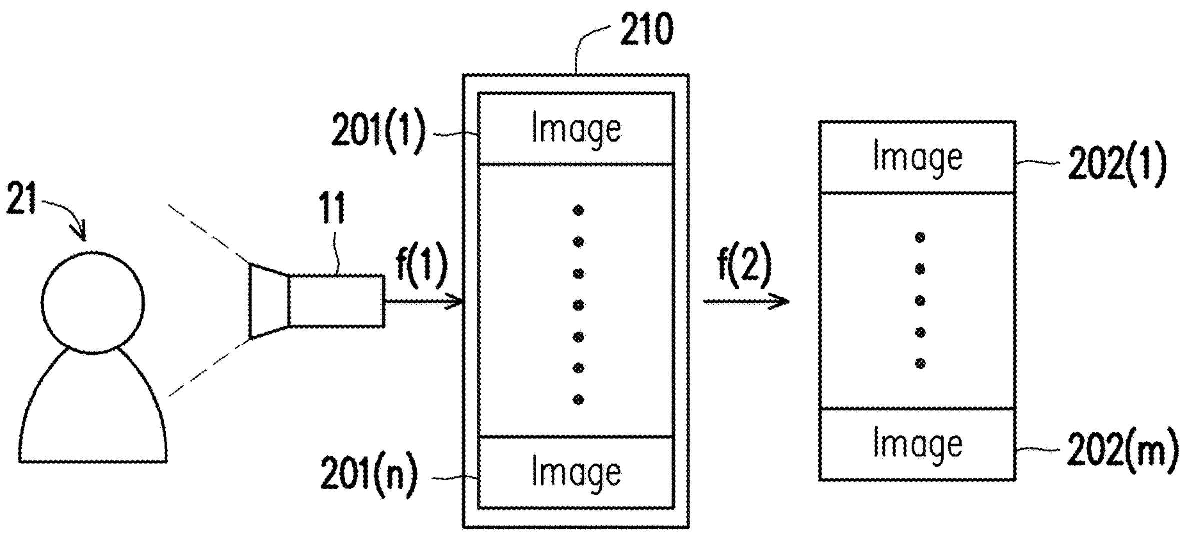
FIG. 2 is a schematic diagram illustrating the sequential acquisition of a candidate image and a target image according to an embodiment of the disclosure.

FIG. 2 is a schematic diagram illustrating the sequential acquisition of a candidate image and a target image according to an embodiment of the disclosure. Referring to FIG. 1 and FIG. 2, in an embodiment, the processor 13 may obtain multiple images 201(1) to 201(*n*) (that is, candidate images) through the image capture device 11 based on the frequency f(1) (that is, the first image capture frequency). For example, images 201(1) to 201(*n*) may present a head image of a user 21 (that is, the target user). Then, the processor 12 may cache the images 201(1) to 201(*n*) in an image register 210.

In an embodiment, the image register 210 may be disposed in the image capture device 11, the processor 13, or the storage circuit 14. Alternatively, in an embodiment, the image register 210 may be disposed in the electronic device 10 but independent of the image capture device 11, the processor 13, or the storage circuit 14, which is not limited by the disclosure.

In an embodiment, within the predetermined time range, the total number (that is, the first image number) of images 201(1) to 201(*n*) obtained through the image capture device 11 may be controlled by the frequency f(1) (that is, the first image capture frequency). For example, the frequency f(1) (that is, the first image capture frequency) may be positively correlated with the total number (that is, the first image number) of images 201(1) to 201(*n*) obtained through the image capture device 11 within the predetermined time range.

In an embodiment, after obtaining the images 201(1) to 201(*n*), the processor 13 may extract the images 202(1) to 202(*m*) (that is, the target images) from the image register 210 based on the frequency f(2) (that is, the second image capture frequency). Specifically, within the predetermined time range, the total number (that is, the second image number) of images 202(1) to 202(*m*) extracted from the image register 210 may be controlled by the frequency f(2) (that is, the second image capture frequency). For example, the frequency f(2) (that is, the second image capture frequency) may be positively correlated with the total number (that is, the second image number) of images 202(1) to 202(*m*) extracted from the image register 210 within the predetermined time range.

In an embodiment, the second image capture frequency (that is, a frequency value f(2)) may be less than the first image capture frequency (that is, a frequency value f(1)). In an embodiment, the total number of images 202(1) to 202(*m*) (that is, the second image number) may be less than the total number of images 201(1) to 201(*n*) (that is, the first image number).

In an embodiment, after obtaining the target image data, the processor 13 may process the target image data through the image analysis module 101 to obtain the information (that is, the situational information) related to the target user (for example, the user 21 in FIG. 2). For example, the processor 13 may input the target image data into the image analysis module 101 for analysis. Then, the processor 13 may obtain the situational information related to the target user according to the output of the image analysis module 101. For example, the situational information may reflect at least one of the head posture of the target user, the head position of the target user, the total number of target users, the eye state of the target user, and the emotional state of the target user.

In an embodiment, the situational information may include head angle information. The head angle information may reflect the head posture of the user (that is, the target user) appearing in front of the image capture device 11. For example, the head angle information may include at least one angle parameter. Each angle parameter may reflect the rotational state of the head of the target user in a certain dimension. For example, the head angle information may reflect that the current head rotational state of the target user is 10 degrees upward and 8 degrees to the right, etc., and the disclosure is not limited thereto.

In an embodiment, the situational information may include head position information. The head position information may reflect the position of the head of the user (that is, the target user) appearing in front of the image capture device 11. For example, the head position information may include at least one coordinate parameter (or spatial parameter). Each coordinate parameter (or spatial parameter) may reflect the position of the head of the target user in one-dimensional, two-dimensional, or three-dimensional space.

In an embodiment, the situational information may include user quantity information. The user quantity information may reflect the total number of users (that is, the target users) appearing in front of the image capture device 11. For example, the assumption that the user quantity information is "1" indicates that currently only 1 target user appears in front of the image capture device 11. Alternatively, the assumption that the user quantity information is "2" indicates that currently 2 target users appear in front of the image capture device 11.

In an embodiment, the situational information may include eye state information. The eye state information may reflect the eye state of the user (that is, the target user) appearing in front of the image capture device 11. For example, the eye state information may reflect whether the eyes of the target user are currently open or closed. Alternatively, the eye state information may also reflect the direction the eyes of the target user are currently looking at (that is, gaze direction) and/or the position of the pupils.

In an embodiment, the situational information may include emotional state information. The emotional state information may reflect the emotional state of the user (that is, the target user) appearing in front of the image capture device 11. For example, the emotional state information may reflect that the current emotion of the target user is happy, sad, or angry, etc., and the types of the emotions of the target user that the emotional state information may reflect are not limited thereto.

It should be noted that the various situational information mentioned above are only examples and are not intended to limit the disclosure. In an embodiment, the situational information may also be expanded or adjusted according to practical requirements, which is not limited by the disclosure.

In an embodiment, after obtaining the situational information, the processor 13 may process the situational information through the audio adjustment module 102 to obtain the audio adjustment parameter. For example, the processor 13 may input the situational information into the audio adjustment module 102 for analysis. Then, the processor 13 may obtain the audio adjustment parameter based on the output of the audio adjustment module 102. Subsequently, the processor 13 may adjust the output audio of the audio output device 12 based on the audio adjustment parameter. For instance, based on the audio adjustment parameter, the processor 13 may adjust a volume setting of at least one channel (for example, left channel and/or right channel) of the audio output device 12, instruct the audio output device 102 to output a specific sound effect (for example, alert sounds or prompt tones), instruct the audio output device 102 to automatically mute, and/or instruct the audio output device 102 to play a specific type (for example, specific styles) of music.

Figure 3:
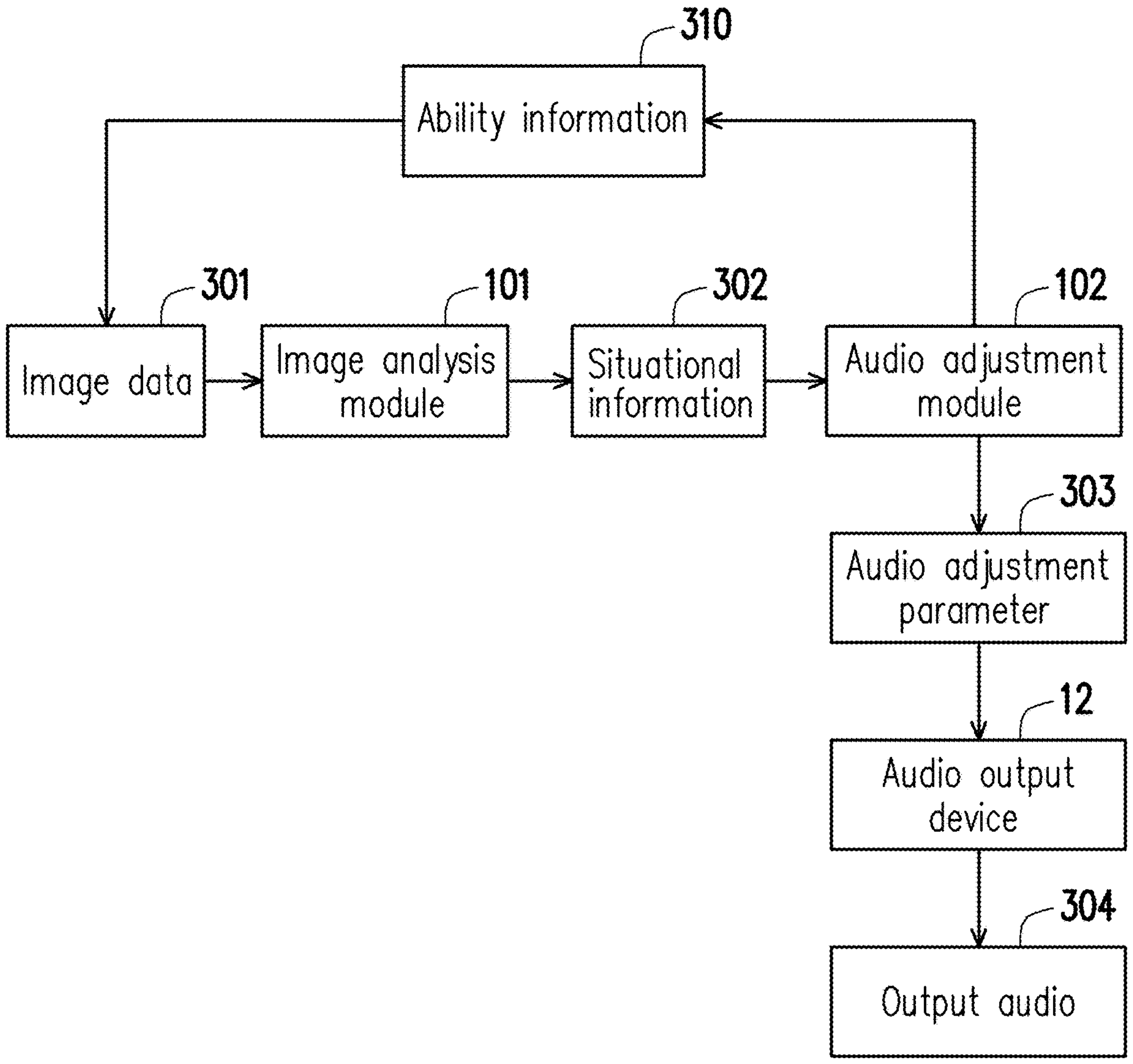
FIG. 3 is a flowchart illustrating an operation of an audio control program according to an embodiment of the disclosure.

FIG. 3 is a flowchart illustrating an operation of an audio control program according to an embodiment of the disclosure. Referring to FIG. 1 and FIG. 3, after obtaining image data 301 (that is, target the image data, such as the images 202(1) to 202(*m*) in FIG. 2), the processor 13 may analyze the image data 301 through the image analysis module 101 to obtain situational information 302. The situational information 302 may reflect at least one of the head posture of the target user, the head position of the target user, the total number of target users, the eye state of the target user, and the emotional state of the target user. Next, the processor 13 may process the situational information 302 through the audio adjustment module 102 to obtain an audio adjustment parameter 303. Subsequently, the processor 13 may instruct the audio output device 12 to adjust the output audio 304 according to the audio adjustment parameter 303.

In an embodiment, before obtaining the image data 301 (that is, target image data), the processor 13 may also obtain ability information 310 corresponding to the audio adjustment module 102. The ability information 310 may reflect the adjustment ability of the audio adjustment module 102 for the output audio 304 of the audio output device 12. For example, the ability information 310 may be actively provided by the audio adjustment module 102 or obtained by the processor 13 through methods such as table lookup. Then, the processor 13 may decide the second image capture frequency according to the ability information 310. For instance, the decided second image capture frequency may influence or control the total number of target images (that is, the second image number) in the image data 301. Thereby, the processor 13 may obtain the image data 301 based on the second image capture frequency. Regarding the operational details of how to obtain the image data 301 (that is, the target image data) based on the second image capture frequency, please refer to the embodiment in FIG. 2, which is not repeated here.

Figure 4:
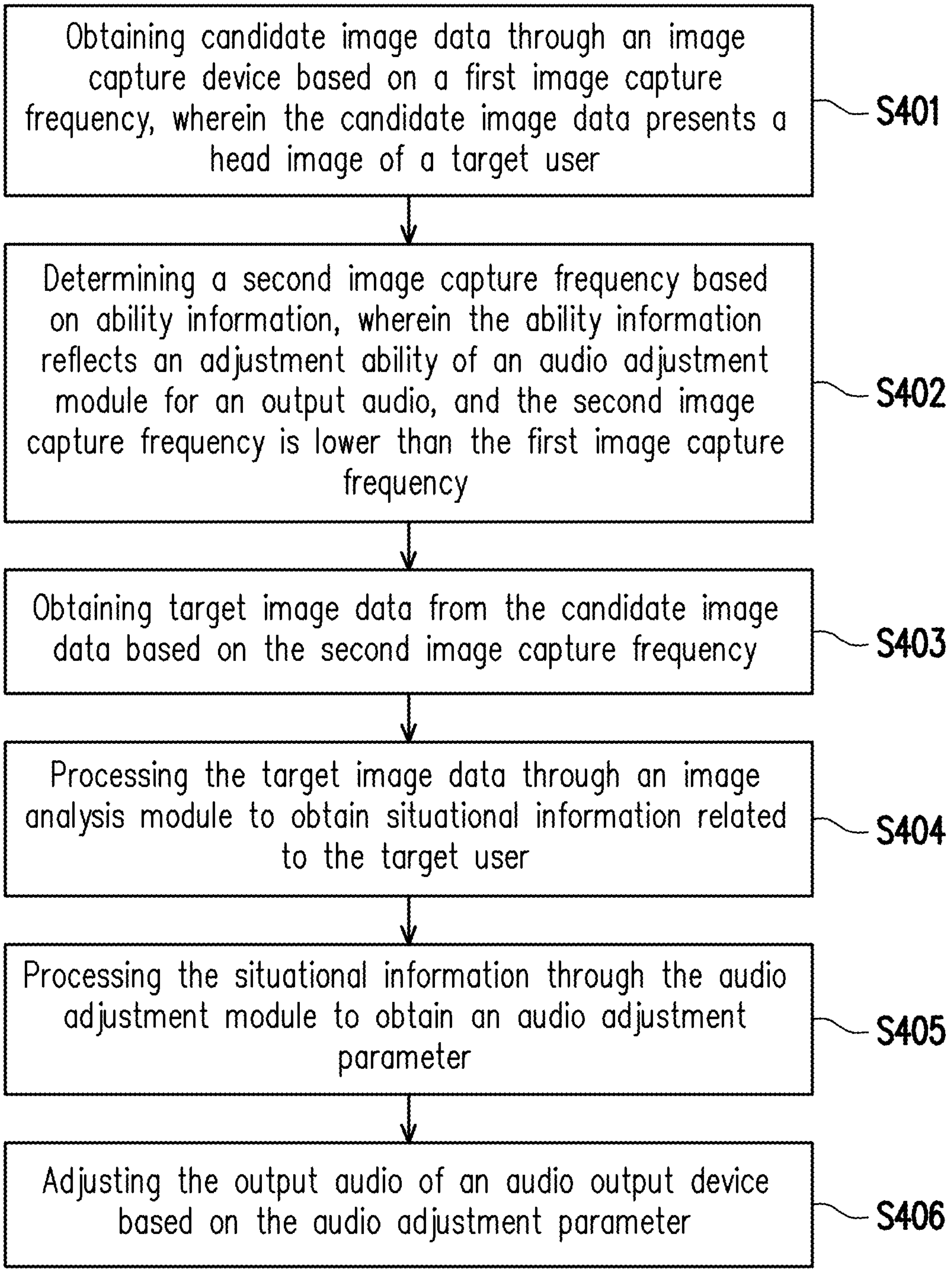
FIG. 4 is a flowchart illustrating an audio control method according to an embodiment of the disclosure.

FIG. 4 is a flowchart illustrating an audio control method according to an embodiment of the disclosure. Referring to FIG. 4, in step S401, the candidate image data is obtained through the image capture device based on the first image capture frequency, where the candidate image data presents the head image of the target user. In step S402, the second image capture frequency is determined according to the ability information, where the ability information reflects the adjustment ability of the audio adjustment module for the output audio, and the second image capture frequency is lower than the first image capture frequency. In step S403, the target image data is obtained from the candidate image data based on the second image capture frequency. In step S404, the target image data is processed through the image analysis module to obtain the situational information related to the target user. In step S405, the situational information is processed through the audio adjustment module to obtain the audio adjustment parameter. In step S406, the output audio of the audio output device is adjusted based on the audio adjustment parameter.

However, each step in FIG. 4 has been explained in detail as above, and is not repeated here. It is worth noting that each step in FIG. 4 may be implemented as multiple codes or circuits, which is not limited by the disclosure. Moreover, the method of FIG. 4 may be used in conjunction with the above exemplary embodiments or used independently, which is not limited by the disclosure.

In summary, the audio control method and the device control system proposed by the embodiments of the disclosure may automatically adjust the output audio of the audio output device according to the results of image analysis for the head image of the user, thereby improving user experience. Furthermore, by properly setting the second image capture frequency, a good balance may be achieved between suppressing the energy consumption generated by the electronic device performing image analysis as much as possible and the automated adjustment of the output audio based on the image analysis.

Although the disclosure has been disclosed by the above embodiments, it is not intended to limit the disclosure. Any person skilled in the art may make minor modifications and refinements without departing from the spirit and scope of the disclosure. Therefore, the protection scope of the disclosure should be defined by the appended claims.

What is claimed is:

1. An audio control method, comprising:

obtaining candidate image data through an image capture device based on a first image capture frequency, wherein the candidate image data presents a head image of a target user, the candidate image data comprises a candidate image obtained through the image capture device within a first predetermined time range, and a total number of the candidate image is controlled by the first image capture frequency;

caching the candidate image data in an image register;

determining a second image capture frequency based on ability information, wherein the ability information reflects an adjustment ability of an audio adjustment module for an output audio of an audio output device, and the second image capture frequency is lower than the first image capture frequency;

obtaining target image data from the candidate image data based on the second image capture frequency, wherein the target image data comprise a target image, the target image is extracted from the image register within a second predetermined time range, and a total number of the target image is controlled by the second image capture frequency;

processing the target image data through an image analysis module to obtain situational information related to the target user;

processing the situational information through the audio adjustment module to obtain an audio adjustment parameter; and adjusting the output audio of the audio output device based on the audio adjustment parameter.

2. The audio control method according to claim 1, wherein the adjustment ability of the audio adjustment module to the output audio of the audio output device reflects at least one of a maximum adjustment time to the output audio within each unit time range and a maximum adjustment magnitude to the output audio within each unit time range.

3. The audio control method according to claim 1, wherein the adjustment ability of the audio adjustment module to the output audio is positively correlated with the second image capture frequency.

4. The audio control method according to claim 1, wherein the situational information reflects at least one of a head posture of the target user, a head position of the target user, a total number of the target user, an eye state of the target user, and an emotional state of the target user.

5. The audio control method according to claim 1, wherein the step of adjusting the output audio of the audio output device based on the audio adjustment parameter comprises at least one of following operations:

adjusting a volume setting of at least one channel of the audio output device, indicating the audio output device to output a specific sound effect, indicating the audio output device to automatically mute, and indicating the audio output device to play a specific type of music.

6. An electronic device, comprising:

an image capture device;

an audio output device; and a processor, coupled to the image capture device and the audio output device, wherein the processor is configured to:

obtain candidate image data through the image capture device based on a first image capture frequency, wherein the candidate image data presents a head image of a target user, the candidate image data comprises a candidate image obtained through the image capture device within a first predetermined time range, and a total number of the candidate image is controlled by the first image capture frequency;

cache the candidate image data in an image register;

determine a second image capture frequency based on ability information, wherein the ability information reflects an adjustment ability of an audio adjustment module to an output audio of the audio output device, and the second image capture frequency is lower than the first image capture frequency;

obtain target image data from the candidate image data based on the second image capture frequency, wherein the target image data comprise a target image, the target image is extracted from the image register within a second predetermined time range, and a total number of the target image is controlled by the second image capture frequency;

process the target image data through an image analysis module to obtain situational information related to the target user;

process the situational information through the audio adjustment module to obtain an audio adjustment parameter; and adjust the output audio of the audio output device based on the audio adjustment parameter.

7. The electronic device according to claim 6, wherein the adjustment ability of the audio adjustment module to the output audio of the audio output device reflects at least one of a maximum adjustment time to the output audio within each unit time range and a maximum adjustment magnitude to the output audio within each unit time range.

8. The electronic device according to claim 6, wherein the adjustment ability of the audio adjustment module to the output audio is positively correlated with the second image capture frequency.

9. The electronic device according to claim 6, wherein the situational information reflects at least one of a head posture of the target user, a head position of the target user, a total number of the target user, an eye state of the target user, and an emotional state of the target user.

10. The electronic device according to claim 6, wherein the operation in which the processor adjusts the output audio of the audio output device based on the audio adjustment parameter comprises at least one of following operations:

adjusting a volume setting of at least one channel of the audio output device, indicating the audio output device to output a specific sound effect, indicating the audio output device to automatically mute, and indicating the audio output device to play a specific type of music.

* * * * *